US011998981B2

United States Patent
Kinoshita et al.

(10) Patent No.: US 11,998,981 B2
(45) Date of Patent: Jun. 4, 2024

(54) FORMING APPARATUS AND METHOD FOR PRODUCING FORMED BODY

(71) Applicant: LG Chem, Ltd., Seoul (KR)

(72) Inventors: Yoshihiro Kinoshita, Tokyo (JP); Eiichiro Narimatsu, Tokyo (JP)

(73) Assignee: LG Chem, Ltd., Seoul (KR)

( * ) Notice: Subject to any disclaimer, the term of this patent is extended or adjusted under 35 U.S.C. 154(b) by 153 days.

(21) Appl. No.: 17/053,001

(22) PCT Filed: Oct. 1, 2019

(86) PCT No.: PCT/KR2019/012822
§ 371 (c)(1),
(2) Date: Nov. 4, 2020

(87) PCT Pub. No.: WO2020/071731
PCT Pub. Date: Apr. 9, 2020

(65) Prior Publication Data
US 2021/0245255 A1   Aug. 12, 2021

(30) Foreign Application Priority Data
Oct. 2, 2018   (JP) ................................. 2018-187307

(51) Int. Cl.
*B22F 12/41*   (2021.01)
*B22F 1/102*   (2022.01)
(Continued)

(52) U.S. Cl.
CPC .............. *B22F 12/41* (2021.01); *B22F 1/102* (2022.01); *B22F 1/107* (2022.01); *B22F 10/16* (2021.01);
(Continued)

(58) Field of Classification Search
CPC .......... B22F 12/41; B22F 10/85; B22F 10/36; B33Y 10/00; B33Y 30/00; B33Y 50/00; B33Y 50/02; B33Y 70/10
See application file for complete search history.

(56) References Cited

U.S. PATENT DOCUMENTS

| 5,132,143 A | 7/1992 | Deckard |
| 2005/0089636 A1 | 4/2005 | Oriakhi et al. |

(Continued)

FOREIGN PATENT DOCUMENTS

| CN | 106634208 A | 5/2017 |
| JP | H06192702 A | 7/1994 |

(Continued)

OTHER PUBLICATIONS

Written Opinion of the International Searching Authority (Translation) for PCT/KR2019/012822 (Year: dated 2020).*

(Continued)

*Primary Examiner* — Ryan M Ochylski
(74) *Attorney, Agent, or Firm* — Lerner David LLP

(57) ABSTRACT

A forming apparatus capable of producing an inorganic material-containing formed body having improved quality and a method of making the same are provided herein. In some embodiments, a forming apparatus includes a stage, a supply unit configured to intermittently or continuously supply a precursor including an inorganic material onto the stage, a heat source unit including a heat source for thermal solidification to perform thermal solidification of the precursor supplied to the stage from the supply unit, and a control unit configured to control the supply unit and the heat source unit such that the heat source for thermal solidification performs thermal solidification of the precursor on the stage, during a period ranging from the start of the
(Continued)

supply of the precursor by the supply unit to the stop of the supply of the precursor, to form a formed body.

14 Claims, 10 Drawing Sheets

(51) Int. Cl.
    *B22F 1/107*     (2022.01)
    *B22F 10/16*     (2021.01)
    *B22F 10/36*     (2021.01)
    *B22F 10/50*     (2021.01)
    *B22F 10/85*     (2021.01)
    *B22F 12/10*     (2021.01)
    *B22F 12/42*     (2021.01)
    *B33Y 30/00*     (2015.01)
    *B22F 12/00*     (2021.01)
    *B22F 12/45*     (2021.01)
    *B22F 12/47*     (2021.01)
    *B22F 12/90*     (2021.01)
    *B33Y 10/00*     (2015.01)
    *B33Y 50/02*     (2015.01)
    *B33Y 70/10*     (2020.01)

(52) U.S. Cl.
    CPC .............. *B22F 10/36* (2021.01); *B22F 10/50* (2021.01); *B22F 10/85* (2021.01); *B22F 12/10* (2021.01); *B22F 12/42* (2021.01); *B33Y 30/00* (2014.12); *B22F 12/226* (2021.01); *B22F 12/45* (2021.01); *B22F 12/47* (2021.01); *B22F 12/90* (2021.01); *B33Y 10/00* (2014.12); *B33Y 50/02* (2014.12); *B33Y 70/10* (2020.01)

(56) References Cited

U.S. PATENT DOCUMENTS

| | | |
|---|---|---|
| 2008/0318189 A1 | 12/2008 | Brodkin et al. |
| 2010/0006228 A1 | 1/2010 | Abe et al. |
| 2014/0275317 A1 | 9/2014 | Moussa |
| 2016/0144570 A1 | 5/2016 | Kim et al. |
| 2016/0243619 A1 | 8/2016 | Gothait et al. |
| 2017/0173688 A1 | 6/2017 | Miyashita |
| 2017/0280567 A1 | 9/2017 | Suzuki et al. |
| 2018/0036945 A1 | 2/2018 | Lereboullet et al. |
| 2018/0311898 A1 | 11/2018 | Schwarzbaum et al. |
| 2019/0375154 A1 * | 12/2019 | Hambling ............... B29C 70/38 |

FOREIGN PATENT DOCUMENTS

| | | |
|---|---|---|
| JP | 2002038201 A | 2/2002 |
| JP | 2009007669 A | 1/2009 |
| JP | 4800074 B2 | 10/2011 |
| JP | 2015157405 A | 9/2015 |
| JP | 2017071841 A | 4/2017 |
| JP | 2017121809 A | 7/2017 |
| JP | 2017136712 A | 8/2017 |
| JP | 2017210620 A | 11/2017 |
| JP | 2018001483 A | 1/2018 |
| JP | 2018138358 A | 9/2018 |
| KR | 20140146689 A | 12/2014 |
| KR | 20170110104 A | 10/2017 |
| KR | 20170119694 A | 10/2017 |
| WO | WO-2015152875 A1 * | 10/2015 ........... B29C 31/044 |
| WO | 2016042657 A1 | 3/2016 |
| WO | 2018005350 A1 | 1/2018 |
| WO | WO-2019068792 A1 * | 4/2019 |

OTHER PUBLICATIONS

International Search Report for Application No. PCT/KR2019/0128220 dated Jan. 13, 2020, 3 pages.

* cited by examiner

FORMING APPARATUS AND METHOD FOR PRODUCING FORMED BODY

CROSS-REFERENCE TO RELATED APPLICATION(S)

This application is a national phase entry under 35 U.S.C. § 371 of International Application No. PCT/KR2019/012822, filed on Oct. 1, 2019, which claims priority from Japanese Patent Application No. 2018-187307, filed on Oct. 2, 2018, the entire contents of which are incorporated herein by reference.

TECHNICAL FIELD

The present disclosure relates to a forming apparatus and a method for producing a formed body.

BACKGROUND ART

In recent years, three-dimensional prototyping techniques that use no mold have been developed to perform shaping of inorganic materials such as metals or metal oxides so as to have any three-dimensional shape.

Stereolithography, which is a typical three-dimensional prototyping technique for inorganic materials, is disclosed in Japanese Patent No. 4800074 (Patent Document 1) and the like. In stereolithography, a forming apparatus includes: a liquid tank for accommodating a liquid precursor in which inorganic particles are dispersed in a liquid photocurable composition; a stage provided liftably in the liquid tank; and a light source that irradiates light for curing the photocurable composition from the upper side of the liquid tank.

The stage is set at a position slightly below the liquid level of the liquid precursor, and curing of a first layer is performed by irradiating light in a predetermined first layer pattern to the liquid precursor located on the stage. After curing the precursor of the first layer according to a predetermined pattern, the uncured liquid precursor of the first layer is washed out (washing process). Next, the stage is descended slightly, and curing of a second layer immediately above the first layer is performed by irradiating light in a predetermined second layer pattern. Such an operation is repeated, and thus curing of the precursor for each layer from the first layer to the uppermost layer is performed, thereby forming a formed body having a predetermined three-dimensional shape, which is composed of a plurality of layers.

The obtained formed body is composed of a cured photocurable composition and inorganic particles dispersed therein. Solvent extraction or heat treatment on this formed body is performed, and thus the photocurable composition is degreased and the organic material component in the formed body is removed (degreasing process). Moreover, after degreasing, the formed body composed of inorganic particles is baked at high temperature, so that the inorganic particles in the formed body are sintered (sintering process), thereby obtaining an inorganic material formed body having a predetermined three-dimensional shape.

However, in this stereolithography, when the three-dimensional shape becomes complex, the washing process becomes difficult, the time required for the washing process also increases, and in some cases, sufficient washing may be impossible depending on the shape, and as a result, deterioration in the quality of the formed body may occur. In the degreasing process, in particular, when the three-dimensional shape is complex, the organic material component or its decomposed component may not be sufficiently removed and may remain in the formed body, and thus deterioration in the quality of the formed body may occur due to such insufficient removal. In addition, since the organic material component is removed by degreasing, a gap corresponding to the volume of the removed organic material component is formed in the formed body, and the entire formed body may be compressed by the size of this gap by sintering, so the dimensions of the finished formed body becomes smaller than the assumed dimensions. As a result, the dimensional accuracy of the formed body may not satisfy the required quality. Moreover, in the sintering process, defects, such as cracks or damage, may occur in the formed body after sintering due to the difference in coefficient of thermal expansion between portions of the formed body, and thus the quality of the formed body may not be ensured. For this reason, improvement in the quality of the formed body produced by a forming apparatus has been required.

PRIOR ART DOCUMENTS

Patent Documents (Patent Document 1): Japanese Patent No. 4800074

DISCLOSURE

Technical Problem

An object of the present disclosure is to provide a forming apparatus capable of producing an inorganic material-containing formed body having improved quality.

Technical Solution

One aspect of the present disclosure is a forming apparatus including: a supply unit configured to intermittently or continuously supply a precursor including an inorganic material onto a stage; a heat source unit including a heat source for thermal solidification above at least the stage in order to perform thermal solidification of the precursor supplied from the supply unit; and a control unit configured to control the supply unit and the heat source unit so that the heat source for thermal solidification performs thermal solidification of the precursor, which has been already supplied, during a period ranging from the start of the supply of the precursor by the supply unit to the stop of the supply.

In the forming apparatus of the aspect, the control unit may control the supply unit and the heat source unit so that the supply of the precursor and the thermal solidification of the precursor are repeated a plurality of times during a period ranging from the start of the supply of the precursor by the supply unit to the stop of the supply.

In the forming apparatus of the aspect, the precursor may include either an organic binder having the inorganic material dispersed therein or an organic coating surrounding the inorganic material; the heat source unit may further include a heat source for degreasing configured to perform degreasing of the organic binder or the organic coating by applying heat to the precursor; and the control unit may control the heat source for degreasing so that the degreasing is performed before thermal solidification by the heat source for thermal solidification is performed. Alternatively, the precursor may include either an organic binder having the inorganic material dispersed therein or an organic coating surrounding the inorganic material, and the heat source for thermal solidification may perform degreasing of the organic binder or the organic coating by applying heat to the precursor.

In the forming apparatus of the aspect, the forming apparatus may further include an immobilization unit configured to immobilize the precursor on the stage. In addition, the precursor may include an organic binder containing a photocurable composition, and the immobilization unit may include a light source configured to perform photocuring of the photocurable composition before thermal solidification. Alternatively, the precursor may include inorganic particles coated with an organic coating, and the immobilization unit may include a heat source for melting configured to perform thermal melting of the organic coating before thermal solidification.

In the forming apparatus of the aspect, the forming apparatus may further include a monitoring unit configured to monitor the precursor on the stage, and the control unit may determine at least one of a position on the stage, to which the precursor is supplied, and a position on the stage, at which the thermal solidification is performed, based on information from the monitoring unit.

In the forming apparatus of the aspect, the control unit may control the supply unit and the heat source unit so that the formed body is formed into a three-dimensional shape by the inorganic material, based on previously input three-dimensional shape data of the formed body.

Another aspect of the present disclosure is a method of producing a formed body from a precursor including an inorganic material, the method including: a supply step of supplying the precursor intermittently or continuously from a supply unit onto a stage; and a thermal solidification step of performing thermal solidification of the precursor by applying heat to the supplied precursor on the stage, during a period ranging from the start of the supply of the precursor by the supply unit to the stop of the supply.

In the method of producing the formed body according to the aspect, the formed body may be formed by repeating the supply step and the thermal solidification step.

In the method of producing the formed body according to the aspect, the method may further include a stage moving step of moving the stage downward in a vertical direction, and the formed body having a three-dimensional shape may be formed by repeating the supply step, the thermal solidification step and the stage moving step.

In the method of producing the formed body according to the aspect, the thermal solidification step may be performed by locally irradiating a laser or an electron beam to the precursor.

In the method of producing the formed body according to the aspect, the method may further include, before the thermal solidification step, a curing step of curing the supplied precursor. In addition, the method may further include, after the curing step and before the thermal solidification step, a degreasing step of performing degreasing of the cured precursor.

In the method of producing the formed body according to the aspect, the method may further include a position determination step of determining at least one of a position on the stage, to which the precursor is supplied in the supply step, and a position on the stage, at which the thermal solidification is performed in the thermal solidification step, based on arrangement of the precursor on the stage.

Figure 1:
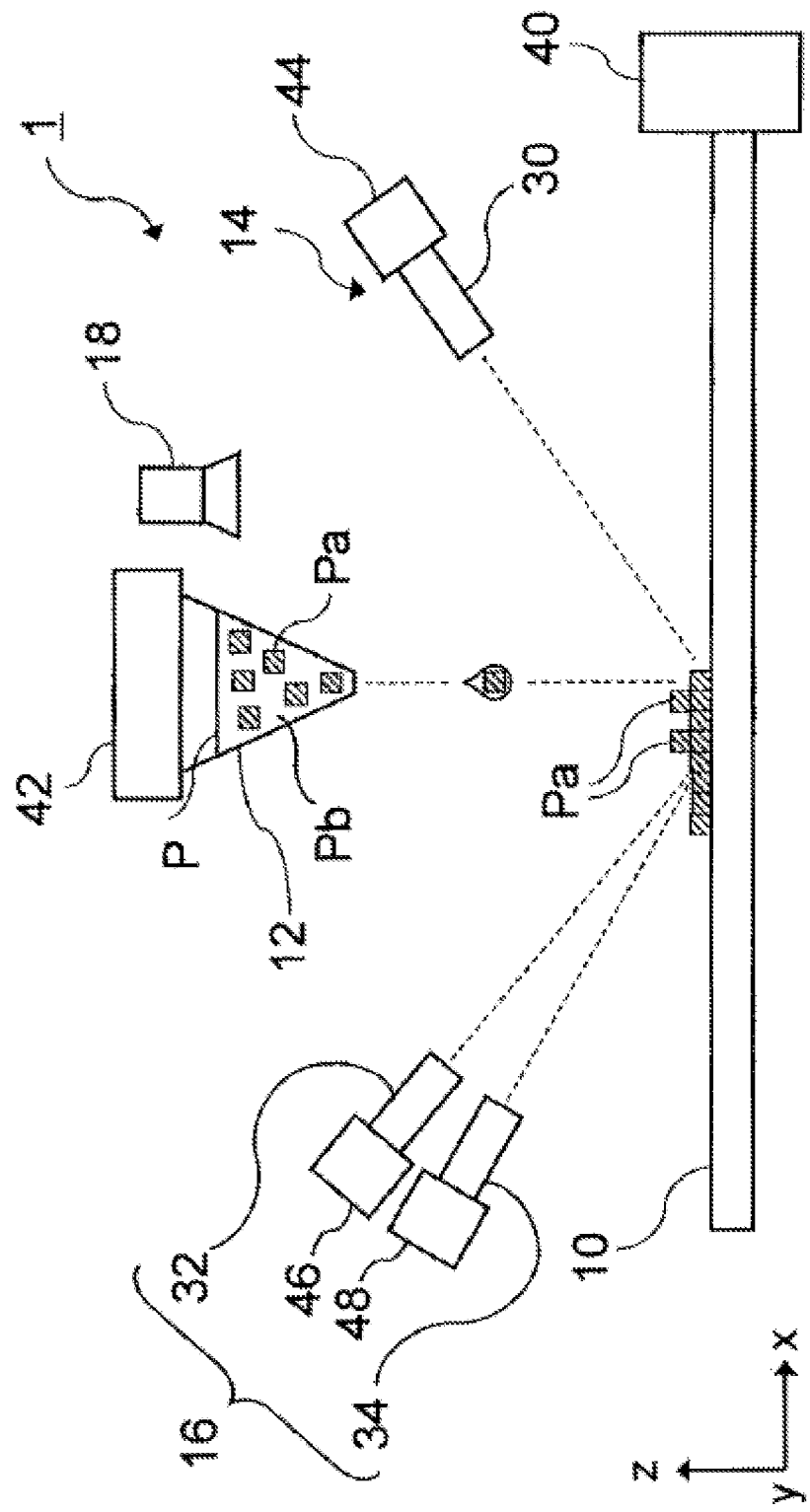
FIG. 1 is a schematic front view showing a forming apparatus according to a first embodiment.

DESCRIPTION OF REFERENCE NUMERALS 1, 101, 201: forming apparatus
10, 110, 210: stage
12, 112, 212: dispenser
14, 114, 214: immobilization unit
16, 116, 216: heat source unit
18, 118, 218: monitoring unit
20, 120, 220: control unit
22, 122, 222: input unit
30, 130: LED
32, 232: laser for degreasing
34, 234: laser for thermal solidification
40, 140, 240: stage moving mechanism
42, 142, 242: dispenser moving mechanism
44, 144: LED moving mechanism
46, 246: degreasing-laser moving mechanism
48, 248: thermal solidification laser moving mechanism
132: laser for degreasing/thermal solidification
146: degreasing/thermal solidification laser moving mechanism
230: laser for melting
244: melting-laser moving mechanism.

BEST MODE

Hereinafter, a forming apparatus and a method for producing a formed body according to embodiments of the present disclosure will be described with reference to the accompanying drawings. In addition, in the following description, like reference numerals refer to components having the same or similar function. The overlapping description of these components will be properly omitted.

For convenience of explanation, the x-direction, the y-direction, and the z-direction will now be defined. The x-direction and the y-direction are directions parallel to the horizontal plane. The y-direction is a direction intersecting (for example, approximately orthogonal) with the x-direction. The z-direction is a direction parallel to the vertical direction and is approximately orthogonal to the x-direction and the y-direction.

First Embodiment

A first embodiment will be described with reference to FIGS. 1 to 4. FIG. 1 is a view showing a forming apparatus 1 according to the first embodiment.

[Configuration]

The forming apparatus 1 may produce a three-dimensional formed body (formed body) composed of an inorganic material. As used herein, the term 'inorganic material' refers to any material other than organic material, and includes compounds composed of single metals, alloys, metal elements and nonmetal elements (for example, metal oxides, metal nitrides, metal salts, etc.), compounds composed of nonmetal elements (for example, boron nitride, etc.), and the like.

The forming apparatus 1 includes a stage 10, a dispenser (supply unit) 12, an immobilization unit 14, a heat source unit 16, a monitoring unit 18, and a control unit 20.

The stage 10 is a flat plate disposed along a horizontal plane (i.e., disposed parallel to the xy-plane). The thickness direction of the stage 10 is approximately parallel to the z-direction. The stage 10 is movable at least in the z-direction by a stage moving mechanism 40. The stage moving mechanism 40 is, for example, a rack-and-pinion type actuator driven by a motor (not shown).

The dispenser 12 is spaced apart from the stage 10 and disposed above the stage 10. The dispenser 12 is movable in at least the x-direction and the y-direction by a dispenser moving mechanism 42. The dispenser moving mechanism 42 is, for example, an articulated arm driven by a motor (not shown).

The dispenser 12 is filled with a precursor P containing an inorganic material. The dispenser 12 can discharge the precursor P intermittently or continuously onto the stage 10. The discharge amount (for example, the volume of one drop in the case where the precursor P is intermittently discharged) or discharge rate of the dispenser 12 can be appropriately adjusted. The detail of the precursor P will be described later.

The immobilization unit 14 immobilizes the discharged precursor P onto the stage 10. For example, when the precursor P contains a photocurable composition, the immobilization unit 14 irradiates light (for example, ultraviolet light) to a specific position on the stage 10, at which the precursor P is present. Accordingly, the immobilization unit 14 can give optical stimulation to the precursor P on the stage 10, thereby curing the photocurable composition contained in precursor P.

The immobilization unit 14 includes an LED (light emitting diode; light source) 30 as a light source. The LED 30 is spaced apart from the stage 10 and disposed above the stage 10. The LED 30 is movable at least in the x-direction and/or the y-direction by an LED moving mechanism 44, and is rotatable about the z axis, for example, and is rotatable even in a plane parallel to the z-axis. The LED moving mechanism 44 changes the irradiation position of the LED 30 by changing the arrangement (for example, direction or position) of the LED 30. The LED moving mechanism 44 is, for example, an articulated arm which is driven by a motor (not shown).

However, the configuration of the LED 30 is not limited to the above example. For example, the LED 30 may irradiate light from the side or the bottom of the stage 10. In addition, the LED moving mechanism 44 may be omitted, and the arrangement of the LED 30 may be immobilized permanently, and the irradiated light may be scanned on the stage 10 using, for example, a lens or a reflecting plate. The LED moving mechanism 44 may be used in combination with a lens, a reflecting plate, or the like.

In addition, the component of the immobilization unit 14 is not limited to the LED, and may be any element capable of irradiating light, such as a laser. Light irradiation may be performed locally on a precursor P spot having a size of about one drop to several drops on the stage 10, and may also be performed on a portion or the whole of the stage 10.

Here, for example, when a one-dimensional array type LED arranged to surround the entire width of the stage 10 along the x-direction or the y-direction is used, the LED may move only in any one of the x-direction and the y-direction. Moreover, for example, when the LED 30 capable of irradiating light to the whole of the stage 10 is used, the component that controls the light irradiation position of the LED 30, such as the LED moving mechanism 44, a lens, a reflecting plate, etc., is unnecessary The heat source unit 16 locally applies heat to a specific position on the stage 10 by, for example, irradiating a heat ray. As a result, the heat source unit 16 can perform degreasing of the precursor P immobilized onto the stage 10 or sintering or melting-solidification of the inorganic material contained in the precursor P. As used herein, the term 'sintering' refers to heating the solid particles (for example, powder of metal oxide, metal nitride, etc.) of the inorganic material contained in the precursor P to a temperature lower than the melting point of the inorganic material, thereby bonding the solid particles together. The term 'melting solidification' means heating the solid particles (for example, particles of a metal or an alloy) of the inorganic material contained in the precursor P to a temperature equal to or higher than the melting point of the inorganic material, thereby melting the solid particles, and then solidifying the metal particles or alloy particles by natural cooling or the like. In the present specification, sintering and melting solidification are collectively referred to as 'thermal solidification'.

The heat source unit 16 includes a laser for degreasing (heat source for degreasing) 32 and a laser for thermal solidification (heat source for thermal solidification) 34 as heat sources. The laser for degreasing 32 and the laser for thermal solidification 34 are spaced apart from the stage 10 and disposed above the stage 10. The laser for degreasing 32 is movable in at least the x-direction and the y-direction by a degreasing-laser moving mechanism 46, and is rotatable, for example, about the z axis, and is also rotatable in a plane parallel to the z axis. The degreasing-laser moving mechanism 46 is, for example, an articulated arm driven by a motor (not shown). The laser for thermal solidification 34 is movable in at least the x-direction and the y-direction by a thermal solidification-laser moving mechanism 48, and is rotatable, for example, about the z axis, and is also rotatable in a plane parallel to the z-axis. The thermal solidification-laser moving mechanism 48 is, for example, an articulated arm which is driven by a motor (not shown).

The laser for degreasing 32 may perform laser irradiation to the precursor P and heat the precursor P to a temperature of, for example, 200° C. to 800° C., preferably 300° C. to 500° C., thereby achieving degreasing of the precursor P. The laser for thermal solidification 34 may perform laser irradiation to the precursor P and heat the precursor P to a temperature of, for example, 500° C. to 4000° C., preferably 1000° C. to 3000° C., thereby achieving thermal solidification of the precursor P. However, the heating temperature is not limited thereto, and may be properly changed depending on the kind of inorganic particles Pa or binder Pb included in the precursor P. In addition, by using two identical laser devices as the laser for degreasing 32 and the laser for thermal solidification 34 and adjusting the output, heating to different temperatures from the laser for degreasing 32 and the laser for thermal solidification 34 may also be performed.

In addition, the component of the heat source unit 16 is not limited to the laser, and may be any element capable of performing local heating, such as an electron beam apparatus. In addition, the heating is not limited to the heating from above, and for example, local heating from below may also be performed.

The monitoring unit 18 monitors the state of the precursor P on the stage 10. The monitoring unit 18 includes, for example, an imaging camera spaced apart from the stage 10 and disposed above the stage 10. This imaging camera continuously photographs the state of the surface of the stage 10, and the monitoring unit 18 detects the landing position and timing of the precursor P on the stage 10 based on the photographed image. Moreover, the monitoring unit 18 monitors the state (for example, state of thermal shrinkage) of the precursor P already located on the stage 10. In addition, the component of the monitoring unit 18 is not limited to the imaging camera, and may also be a vibration detection device, heat detection device, or the like provided on the stage 10, or may be a radiation analyzer (for example, X-ray diffraction device), an ultrasonic analyzer, or the like, which observes the state of the stage surface by irradiating radiation or ultrasonic waves onto the stage 10, and these devices may also be used in combination.

The control unit 20 receives input data, such as three-dimensional shape data of the formed body produced, and controls each component of the forming apparatus 1. The control unit 20 is realized by, for example, a processor such as a central processing unit (CPU) or a graphics processing unit (GPU). The operation of the control unit 20 will be described later.

[Precursor]

The precursor P that is discharged by the dispenser 12 is, for example, a fluid containing inorganic particles Pa and a binder Pb. The precursor P is prepared by dispersing the inorganic particles Pa in the binder Pb. The precursor P is filled in the dispenser 12 in a state in which the inorganic particles Pa are dispersed in the binder Pb.

The inorganic particles Pa are, for example, particles composed of any inorganic materials, such as a metal, an oxide, a nitride, an oxynitride, a carbide, a hydroxide, a carbonate, and a phosphate, or a combination thereof. The material of the inorganic particle Pa is not particularly limited.

Examples of the metal may include aluminum, titanium, iron, copper, stainless steel, nickel chromium steel, and the like.

Examples of the oxide may include silicon dioxide, aluminum oxide, magnesium oxide, titanium oxide, iron oxide, zinc oxide, yttrium oxide, zirconium oxide, barium titanate, and the like.

Examples of the nitride may include silicon nitride, aluminum nitride, titanium nitride, iron nitride, and the like.

Examples of the oxynitride may include silicon oxynitride, aluminum oxynitride, and the like.

Examples of the carbide include silicon carbide, titanium carbide, boron carbide, zirconium carbide, and the like.

Examples of the hydroxide may include magnesium hydroxide, iron hydroxide, hydroxyapatite, and the like.

Examples of the carbonate may include calcium carbonate, sodium carbonate, potassium carbonate, lithium carbonate, and the like.

Examples of the phosphate may include iron phosphate, manganese phosphate, calcium phosphate, and the like.

The binder Pb contains, for example, a photocurable composition that is cured by receiving light having a specific wavelength (for example, ultraviolet light). The photocurable composition contains, for example, a radically polymerizable monomer or a cationically polymerizable monomer, and a photoinitiator. The radically polymerizable monomer is, for example, a (meth)acrylic monomer. The cationically polymerizable monomer is, for example, an epoxy compound or a cyclic ether compound. When the radically polymerizable monomer is used, the photoinitiator is, for example, a radical photoinitiator such as acetophenone. Moreover, when the cationically polymerizable monomer is used, the photoinitiator is, for example, a cationic photoinitiator such as an onium salt.

The content of the inorganic particles Pa in the precursor P is, for example, 30 wt % to 90 wt %, preferably 40 wt % to 80 wt %, more preferably, 50 wt % to 70 wt %.

The precursor P may contain any additives, such as a stabilizer, a dispersing agent and a filler, in addition to the inorganic particles Pa and the binder Pb.

[System Configuration]

Hereinafter, the system configuration of the forming apparatus 1 of the first embodiment will be described with reference to FIG. 2.

Figure 2:
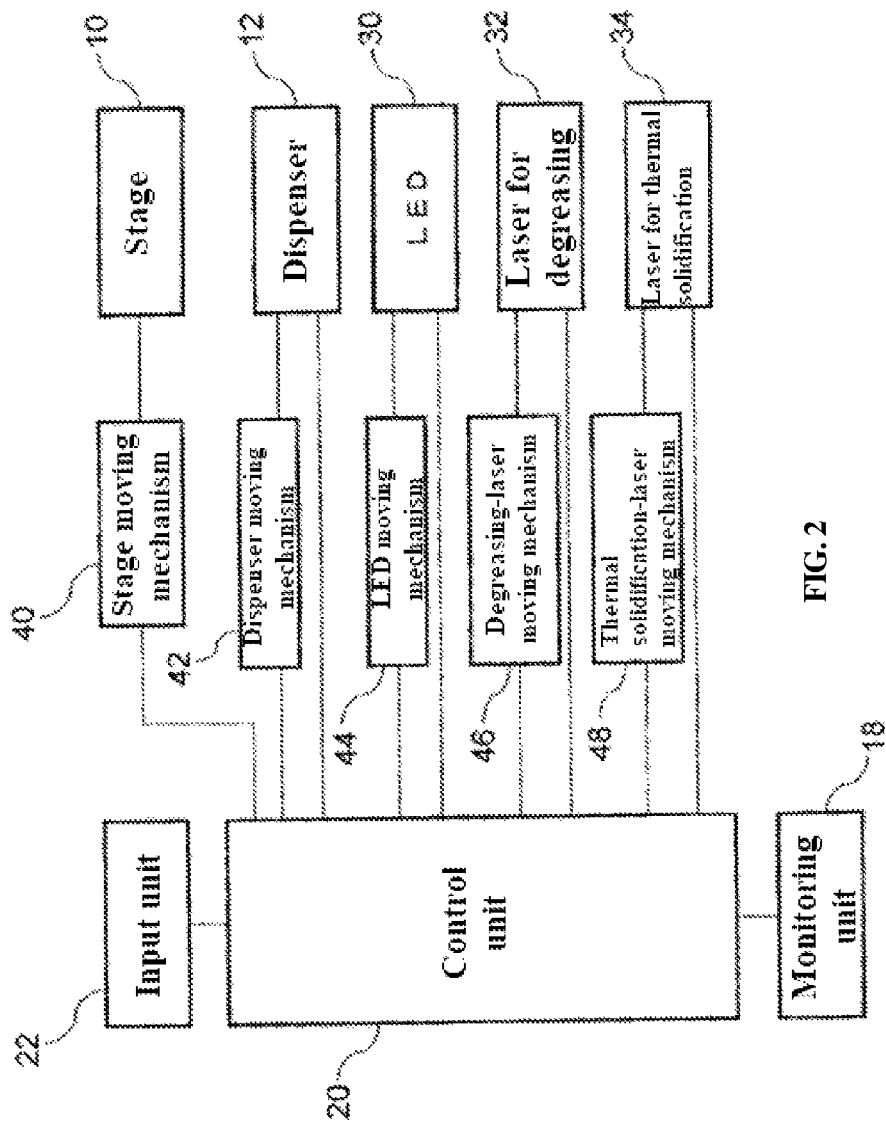
FIG. 2 is a block diagram showing an example of a system configuration of the forming apparatus of the first embodiment.

FIG. 2 is a block diagram showing an example of the system configuration of the forming apparatus 1 of the first embodiment.

The input unit 22 receives the input data of the formed body to be produced, and also transmits the input data to the control unit 20.

The monitoring unit 18 acquires monitoring data of the precursor P on the stage 10 and also transmits the monitoring data to the control unit 20. The monitoring data include information about landing of the precursor P (for example, the landing position, timing or the like of the precursor P) on the stage 10 or information on the precursor P already positioned on the stage 10 (for example, the position, shape, thermal shrinkage state or the like of the precursor P).

The control unit 20 controls the stage moving mechanism 40 so that the stage 10 moves to an appropriate position, based on the input data and the monitoring data received from the monitoring unit 18. In addition, the control unit 20 controls the dispenser moving mechanism 42, the LED moving mechanism 44, the degreasing-laser moving mechanism 46, and the thermal solidification-laser moving mechanism 48 so that the dispenser 12, the LED 30, the laser for degreasing 32, and the laser for thermal solidification 34 are properly arranged.

Moreover, the control unit 20 controls the dispenser 12 so that an appropriate amount of the precursor P may be discharged at a suitable timing, based on input data, monitoring data, and the like. In addition, the control unit 20 controls each of the LED 30, the laser for degreasing 32 and the laser for thermal solidification 34 so that light for curing the binder Pb or laser light for performing degreasing and thermal solidification is irradiated at an appropriate timing, based on input data, monitoring data, and the like.

[Method for Producing Formed Body]

Hereinafter, an example of a method of producing a formed body by the forming apparatus 1 of the first embodiment will be described with reference to FIGS. 3A-3F and 4.

FIGS. 3A-3F are views showing an example of a method of producing a formed body by the forming apparatus 1 of the first embodiment.

FIGS. 3A-3F show a series of processes from the discharge of the precursor P to the thermal solidification in the production method.

Figure 3A:
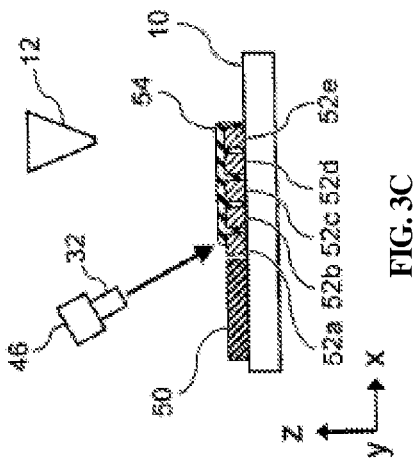
FIGS. 3A to 3F are views showing an example of a method of producing a formed body by the forming apparatus of the first embodiment.

Referring to FIG. 3A, the precursor P is discharged from the dispenser 12 onto the stage 10. Here, the stage 10 has formed thereon a thermally solidified body 50, which was already thermally solidified, and inorganic particles 52a to 52d surrounded by a cured binder 54. In addition, referring to FIG. 3A, discharge of the precursor P is performed in order from the left side (−x direction) to the right side (+x direction) of FIG. 3A. That is, as the process proceeds, the dispenser 12, the immobilization unit 14, and the heat source unit 16 move in the +x direction with respect to the stage 10.

Figure 3B:
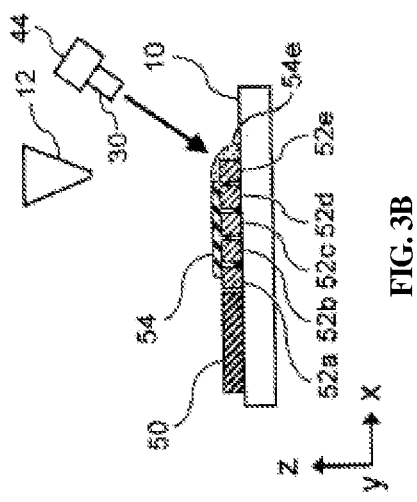

Referring to FIG. 3B, the discharged precursor P lands beside the inorganic particle 52d. The monitoring unit 18 acquires the landing position and timing of the precursor P. Immediately after landing, the binder 54e of the discharged precursor P surrounding the inorganic particle 52e and has fluidity. Toward this binder 54e, the LED 30 of the immobilization unit 14 irradiates light having a wavelength suitable for curing the binder 54e.

Figure 3D:
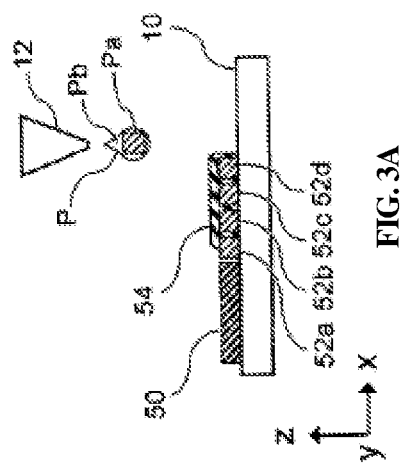
Figure 3C:
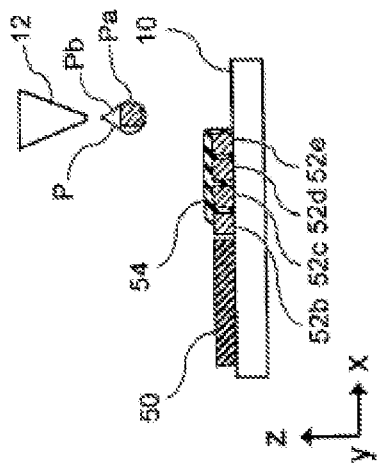

Referring to FIG. 3C, the binder 54e containing a photocurable composition is cured and constitutes a portion of the cured binder 54. As a result, the inorganic particle 52e contained in the discharged precursor P is immobilized onto the stage 10. Next, the laser for degreasing 32 in the heat source unit 16 irradiates laser light to the vicinity of the inorganic particle 52a and applies heat to the binder 54. In addition, although degreasing is performed in the vicinity of the inorganic particle 52a spaced at a certain distance from the inorganic particle 52e immobilized immediately before, the distance between a position at which immobilization of the precursor P is performed and a position at which degreasing (and thermal solidification) is performed immediately after the immobilization may be determined according to various conditions, including the property or discharge rate of the precursor P, the intensity of the laser for degreasing 32, etc. For example, the position at which degreasing is performed may be the same as the position at which immobilization of the precursor P is performed (that is, the position at which degreasing is performed is near the inorganic particle 52e immobilized immediately before).

Referring to FIG. 3D, the binder 54 near the inorganic particle 52a is degreased by the laser for degreasing 32, so that the inorganic particle 52a is exposed. Next, the laser for thermal solidification 34 in the heat source unit 16 irradiates laser light to the vicinity of the boundary between the thermally solidified body 50 and the inorganic particle 52a, thereby applying heat to the thermally solidified body 50 and the inorganic particle (52a). As a result, thermal solidification occurs between the thermally solidified body 50 and the inorganic particle 52a.

Figure 3E:
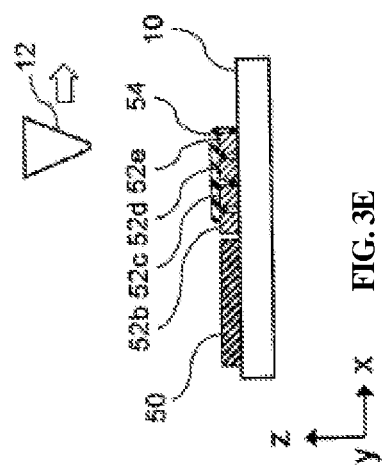

Referring to FIG. 3E, the inorganic particle 52a is integrated with the thermally solidified body 50 by thermal solidification of the thermally solidified body 50 and the inorganic particle 52a. Next, the control unit 20 determines one or both of the discharge position of the next precursor P and the irradiation positions of the immobilization unit 14 and the heat source unit 16, in consideration of the state of thermal shrinkage of the precursor P on the stage 10, based on the image data on the stage 10, received from the monitoring unit 18, radiation analysis data (for example, data obtained by X-ray diffraction measurement), ultrasonic analysis data, or the like. Based on the determined discharge position or irradiation position, the dispenser moving mechanism 42, the LED moving mechanism 44, the degreasing-laser moving mechanism 46, and the thermal solidification-laser moving mechanism 48 move the dispenser 12, the immobilization unit 14 and the heat source unit 16 in the +x direction with respect to the stage 10 (the immobilization unit 14 and the heat source unit 16 are not shown here). This movement direction or movement distance changes according to the next place to which the precursor P is to be discharged. In this example, the next discharge position is right next to the inorganic particle 52e (see FIG. 3F). Of course, depending on the structure of the formed body produced, a section to which the precursor P is not discharged may exist between the inorganic particle 52e and the next discharge position.

Figure 3F:
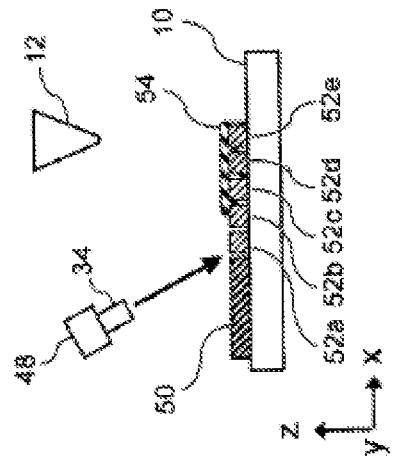

Referring to FIG. 3F, similarly to FIG. 3A, the precursor P is discharged again from the dispenser 12 onto the stage 10. Thereafter, the operation described with reference to FIGS. 3B to 3E is repeated.

Specifically, after the above-described process is performed from one end to the other end of the stage 10 along the x-direction, for example, the dispenser 12, the immobilization unit 14, and the heat source unit 16 are slightly moved along the y-direction, and the above process is performed again from one end to the other end of the stage 10 along the x-direction. When the above process repeated along the x-direction while moving the discharge position and irradiation position little by little in the y-direction as described above, each of the precursor P discharge, immobilization, degreasing and thermal solidification processes can be performed throughout the stage 10.

In addition, the method of moving the dispenser 12, the immobilization unit 14, and the heat source unit 16 with respect to the stage 10 is not limited thereto. For example, the process may also be performed along the y-direction instead of the x-direction. Furthermore, instead of repeating the movement along a specific direction, moving the dispenser 12, the immobilization unit 14 and the heat source unit 16 directly to any position to which the precursor P is to be discharged may also be repeated. For example, among positions to which the precursor P is to be discharged, a position having the shortest distance from the current position of the dispenser 12 may be selected as the next discharge position.

Figure 4:
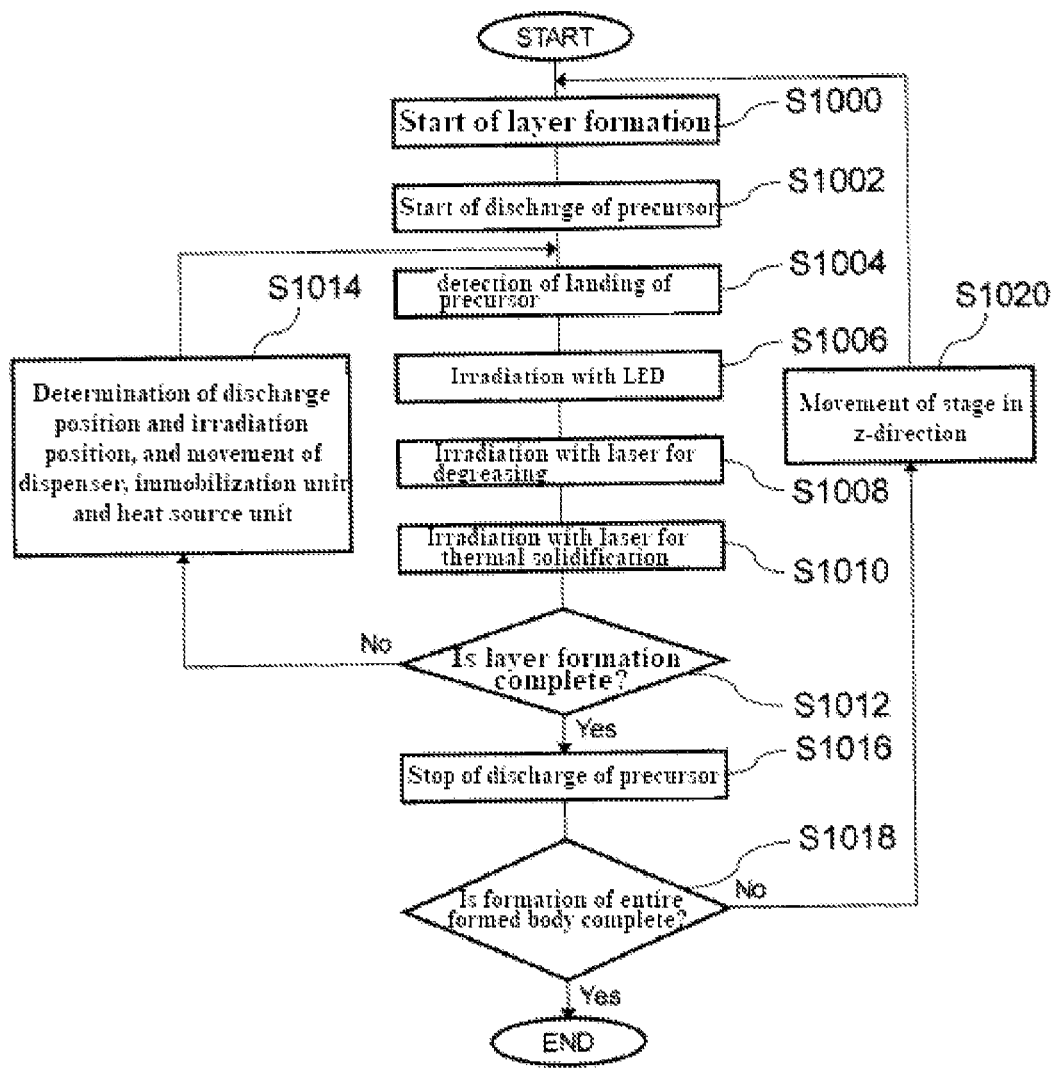
FIG. 4 is a flowchart showing an example of a method of producing a formed body by the forming apparatus of the first embodiment.

FIG. 4 is a flowchart showing an example of a method of producing a formed body by the forming apparatus 1 of the first embodiment.

When formation of a first layer on the stage 10 is started (S1000), the control unit 20 first directs the dispenser 12 to start discharging the precursor P onto the stage 10 (S1002). When the precursor P is discharged and landed on the stage 10, the monitoring unit 18 detects the landing of the precursor P (S1004). For example, the monitoring unit 18 detects the landing position and timing of the precursor P.

Next, the control unit 20 directs the LED 30 to irradiate light for curing the binder Pb of the landed precursor P (S1006). As a result, the precursor P is immobilized on the stage 10.

Next, the control unit 20 directs the laser for degreasing 32 to irradiate laser light for degreasing the binder Pb of the precursor P on the stage 10 (S1008). The irradiation position of the laser for degreasing 32 may be the same as the irradiation position of the LED 30, or may also be other position spaced at a certain distance from an irradiation position of the LED 30 at which immobilization of the precursor P was performed immediately before, as described with reference to FIGS. 3A-3F.

Next, the control unit 20 directs the laser for thermal solidification 34 to irradiate laser light for thermally solidifying the inorganic particles Pa of the precursor P on the stage 10 (S1010). The irradiation position of the laser for thermal solidification 34 may be the same as the irradiation position of the laser for degreasing 32, or may also be other position spaced at a certain distance.

Next, the control unit 20 determines whether or not the formation of the first layer was completed, in view of input data (S1012). If it is determined that formation of the first layer was not completed (S1012: NO), the control unit 20 determines the next discharge position to which the precursor p is to be discharged, and also determines the irradiation position of the LED 30, the laser for degreasing 32 or the laser for thermal solidification 34, based on information such as the position or thermal shrinkage state of the precursor P on the stage 10, acquired by the monitoring unit 18 (S1014). Moreover, based on the determined discharge position and irradiation position, the control unit 20 directs the dispenser moving mechanism 42, the LED moving mechanism 44, the degreasing-laser moving mechanism 46 and the thermal solidification-laser moving mechanism 48 to properly change the arrangement of the dispenser 12, the LED 30, the laser for degreasing 32 and the laser for thermal solidification 34 (S1014). Thereafter, the precursor P is discharged again onto the stage 10, and the flow returns to S1004.

Here, the next discharge position is determined by any method. For example, the next discharge position may be determined according to the order in which the process first proceeds from one end to the other end of the stage 10 along the x-direction, and then proceeds slightly in the y-direction, and proceeds again from one end to the other end of the stage 10 along the x-direction, and proceeds slightly in the y-direction, and this operation is repeated, as described above. In addition, the next discharge position may also be determined based on the distance from the current position of the dispenser 12.

Meanwhile, when it is determined that formation of the first layer has been completed (S1012: YES), the control unit 20 directs the dispenser 12 to stop discharging the precursor P (S1016).

Next, the control unit 20 determines whether or not formation of the entire formed body has been completed, in view of input data (S1018). When it is determined that formation of the formed body has not been completed (S1018: NO), the control unit 20 directs the stage moving mechanism 40 to move the stage 10 in the z-direction (for example, to descend the stage by a distance corresponding to one layer in the z-direction) (S1020). Thereafter, the flow returns to S1000, and formation of a second layer is started.

Meanwhile, when it is determined that formation of the entire formed body has been completed (S1018: YES), production of the formed body is terminated. When the formation of the first layer to the final layer is completed, a formed body having any three-dimensional shape is obtained.

[Effects]

In accordance with the forming apparatus 1 according to the first embodiment as described above, thermal solidification of the precursor P is performed locally several times, and the next precursor P is further supplied even after the thermal solidification operation is performed. For example, since immobilization of the precursor P (curing of the binder Pb), degreasing of the binder Pb, and thermal solidification of the inorganic particles Pa are sequentially performed so as to follow the supply of the precursor P from the dispenser 12, these processes may be subdivided.

Since the degreasing process is subdivided and degreasing is performed on a small amount of the precursor P, the binder Pb is removed by each degreasing operation, so that the binder Pb and the degraded components of the binder Pb may be suppressed from remaining in the formed body, as compared with the case where the entire formed body is degreased at once after three-dimensional shaping of a binder containing inorganic particles dispersed therein is performed, like conventional stereolithography. In addition, in the case where degreasing of the entire formed body is performed, like conventional stereolithography, a gap corresponding to the volume of the binder may occur inside the formed body, and thus the finished formed body may be shrunk by the size of the gap. However, when the degreasing process is subdivided as in the present embodiment, even if such a gap is generated, the precursor P is continuously supplied, so that the gap can be filled by the next precursor P, and thus this shrinkage can be suppressed.

In addition, since the thermal solidification process is subdivided and thermal solidification is performed on a small amount of the precursor P, the occurrence of cracking or breakage of the thermally solidified body due to the difference in thermal expansion coefficient between portions of the formed body can be suppressed, as compared with the case where thermal solidification of the entire degreased formed body is performed after three-dimensional shaping is first performed, like conventional stereolithography. Even if a crack or the like due to thermal expansion or thermal shrinkage occurs, the supply of the precursor P is performed continuously, so that such a defect can be filled by the next precursor P, and thus the adverse effect of such a defect can be suppressed. When the discharge of the precursor P is controlled in a feedback manner based on the thermal solidification result, it is possible to produce a solid formed body having a desired shape and size.

In addition, in the case where three-dimensional shaping is performed by curing a precursor accommodated in a liquid tank for each layer, like conventional stereolithography, it is necessary to remove an uncured binder after curing only a necessary portion for each layer. However, the forming apparatus 1 according to this embodiment does not require this process. For this reason, the cost of the forming process can be reduced and efficiency can also be improved. In addition, the degree of freedom in three-dimensional shaping of an inorganic material can be improved by reducing the restrictions in conventional stereolithography.

As a result, an inorganic material-containing formed body having improved quality can be produced.

Moreover, according to this embodiment, the forming apparatus 1 includes the LED 30 as the immobilization unit 14, and includes the laser for degreasing 32 and the laser for thermal solidification 34 as the heat source unit 16. As a result, it is possible to separately control the execution position, timing, or the like of each of the immobilization, degreasing and thermal solidification processes, making it possible to efficiently perform the sequential forming processes as described above.

In addition, in the above example, the photocurable composition is used as the binder Pb of the precursor P, but the binder Pb is not limited thereto. For example, a thermosetting composition such as phenol resin or polyurethane may be used as the binder Pb, and a heat source (for example, a laser) for curing the thermosetting resin may be used instead of the LED 30 as the component of the immobilization unit 14. In this case, the binder Pb composed of the thermosetting resin is cured by heat from the heat source, and thus the precursor P is immobilized on the stage 10.

Second Embodiment

Hereinafter, a second embodiment will be described with reference to FIGS. 5 and 6. The second embodiment differs from the first embodiment in that degreasing and thermal solidification are performed by a single laser. In addition, configurations other than the configurations described below are the same as those of the first embodiment.

Figure 5:
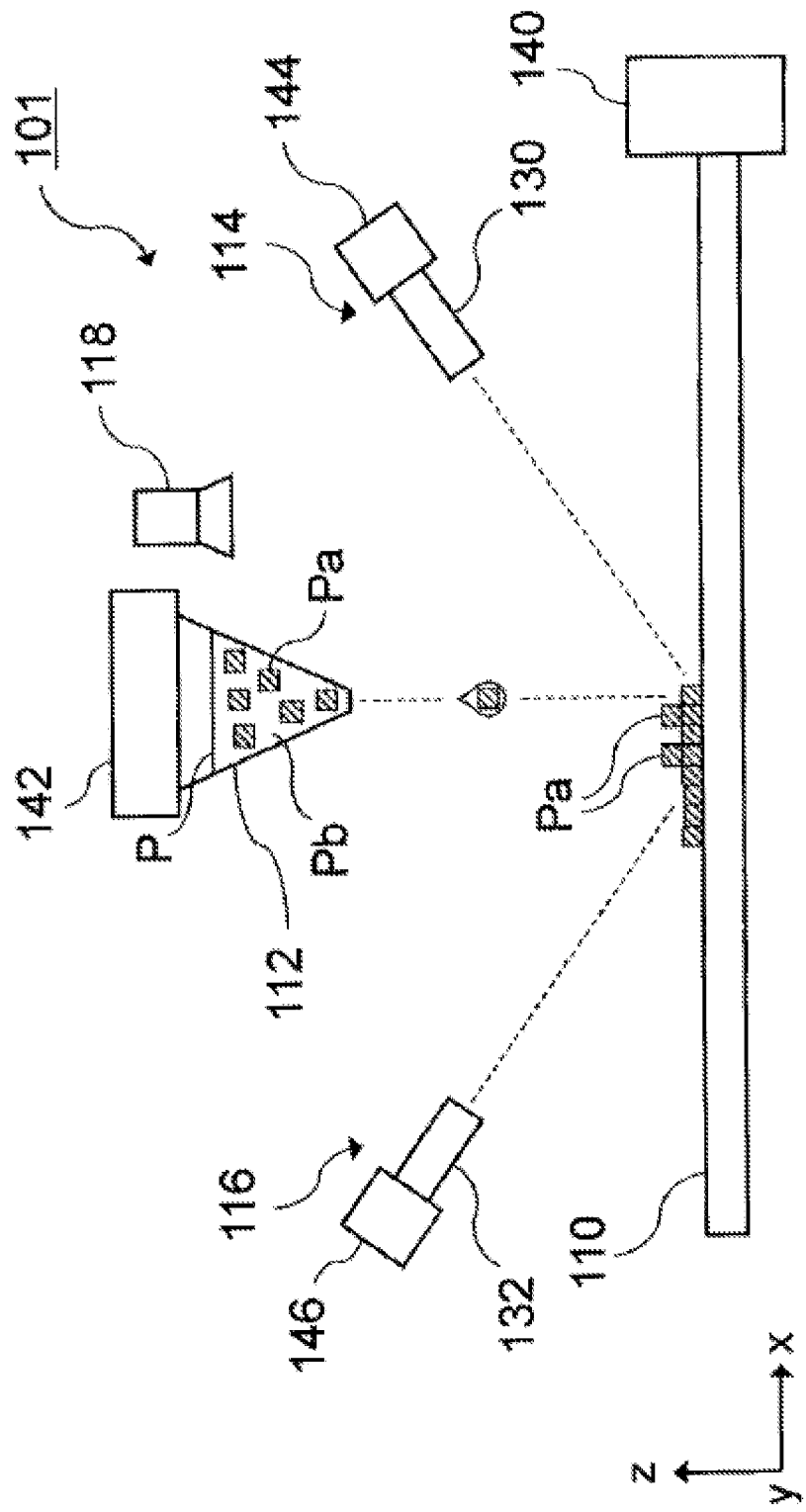
FIG. 5 is a schematic front view showing a forming apparatus according to a second embodiment.
Figure 6:
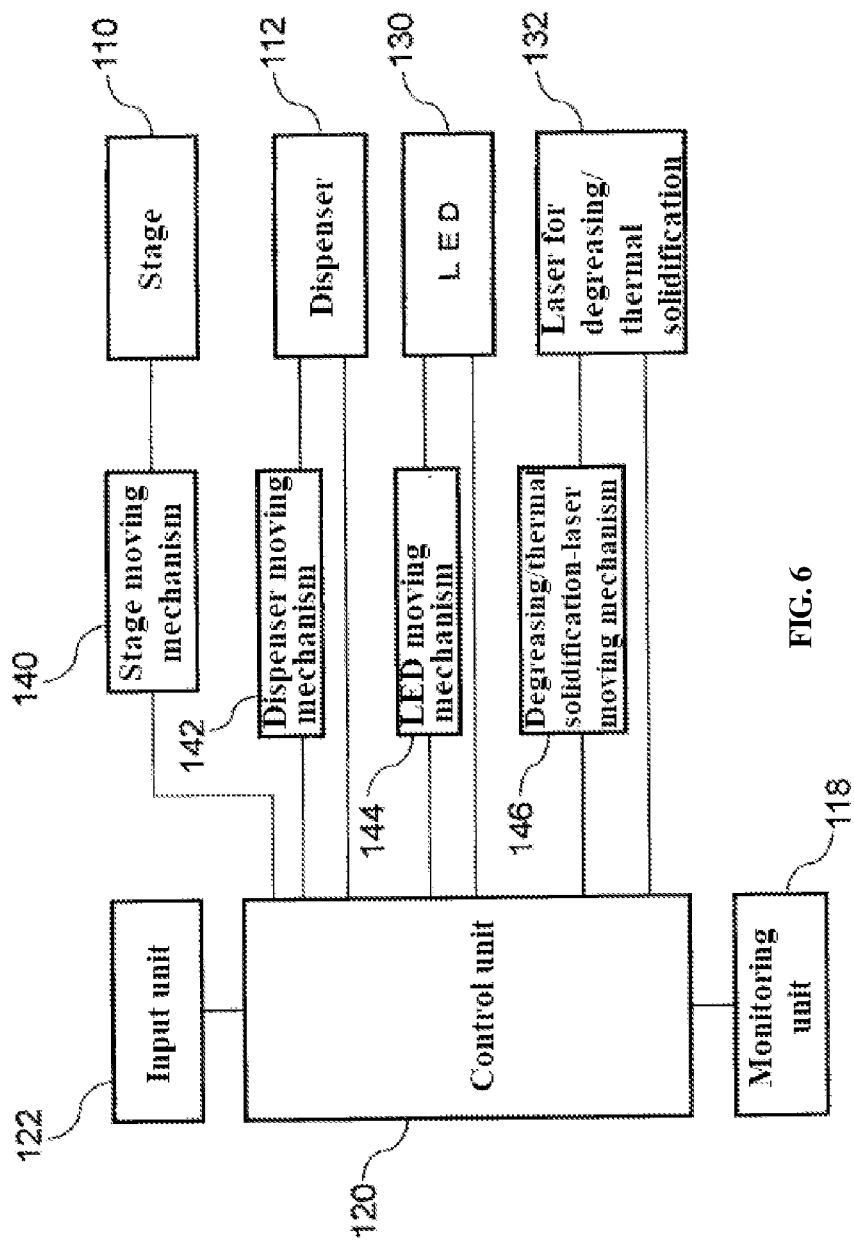
FIG. 6 is a block diagram showing an example of a system configuration of the forming apparatus of the second embodiment.

FIG. 5 is a view showing a forming apparatus 101 according to a second embodiment. FIG. 6 is a block diagram showing an example of the system configuration of the forming apparatus 101 according to the second embodiment.

The forming apparatus 101 according to the second embodiment includes a stage 110, a dispenser 112, an immobilization unit 114, a heat source unit 116, a monitoring unit 118, and a control unit 120. While the heat source unit 16 of the first embodiment includes two lasers, such as the laser for degreasing 32 and the laser for thermal solidification 34, the heat source unit 116 includes a laser for degreasing/thermal solidification 132 which is a single laser.

The laser for degreasing/thermal solidification 132 is spaced apart from the stage 110 and disposed above the stage 110. The laser for degreasing/thermal solidification 132 is movable in at least the x-direction and the y-direction by the degreasing/thermal solidification-laser moving mechanism 146, and is rotatable about the z axis, for example, and is also rotatable in a plane parallel to the z axis.

The laser for degreasing/thermal solidification 132 can apply heat to a specific position on the stage 110 and can apply different amounts of heat depending on the situation, for example, by changing the laser output. Thus, the laser for degreasing/thermal solidification 132 can heat the precursor P on the stage 110 to different temperatures. For example, in the degreasing step in which the precursor P is degreased, the control unit 120 directs the laser for degreasing/thermal solidification 132 to heat the precursor P to a temperature of, for example, 200° C. to 800° C., preferably 300° C. to 500° C. In addition, in the thermal solidification step in which thermal solidification of the precursor P is performed, the control unit 120 directs the laser for degreasing/thermal solidification 132 to heat the precursor P to a temperature of, for example, 500° C. to 4000° C., preferably 1000° C. to 3000° C. However, the heating temperature is not limited thereto, and may be properly changed depending on the kind of inorganic particles Pa or binder Pb contained in the precursor P.

The degreasing step may be omitted, and degreasing and thermal solidification may be performed at the same time by heating the precursor P to the thermal solidification temperature by the laser for degreasing/thermal solidification 132.

In addition, since the laser for degreasing 32 and the laser for thermal solidification 34 are replaced with the single laser for degreasing/thermal solidification 132, one of the degreasing-laser moving mechanism 46 and the thermal solidification-laser moving mechanism 48 is also omitted.

According to the forming apparatus 101 in accordance with the second embodiment, since both degreasing and thermal solidification can be performed by a single heat source (laser for degreasing/thermal solidification 132), the structure of the forming apparatus 101 can be simplified, making it possible to reduce the overall cost.

Third Embodiment

Hereinafter, a third embodiment will be described with reference with FIGS. 7 to 10. The third embodiment differs from the first embodiment in that a precursor P' in which inorganic particles Pa' are surrounded by an organic coating Pb' is used and a laser for melting (heat source for melting) 230 is used instead of the LED 30 as a component of the immobilization unit 214. In addition, configurations other than the configurations described below are the same as those of the first embodiment.

Figure 7:
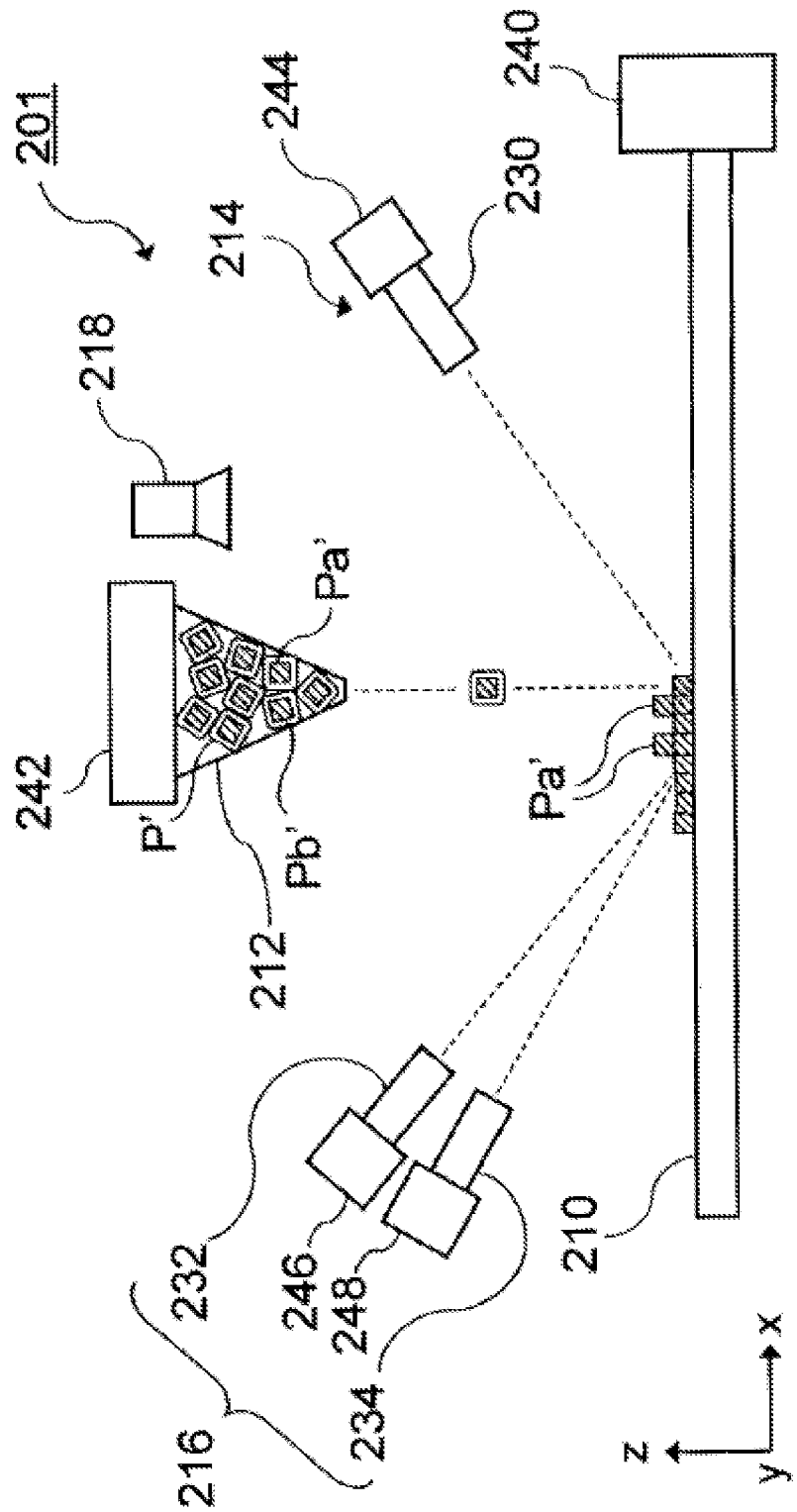
FIG. 7 is a schematic front view showing a forming apparatus according to a third embodiment.
Figure 8:
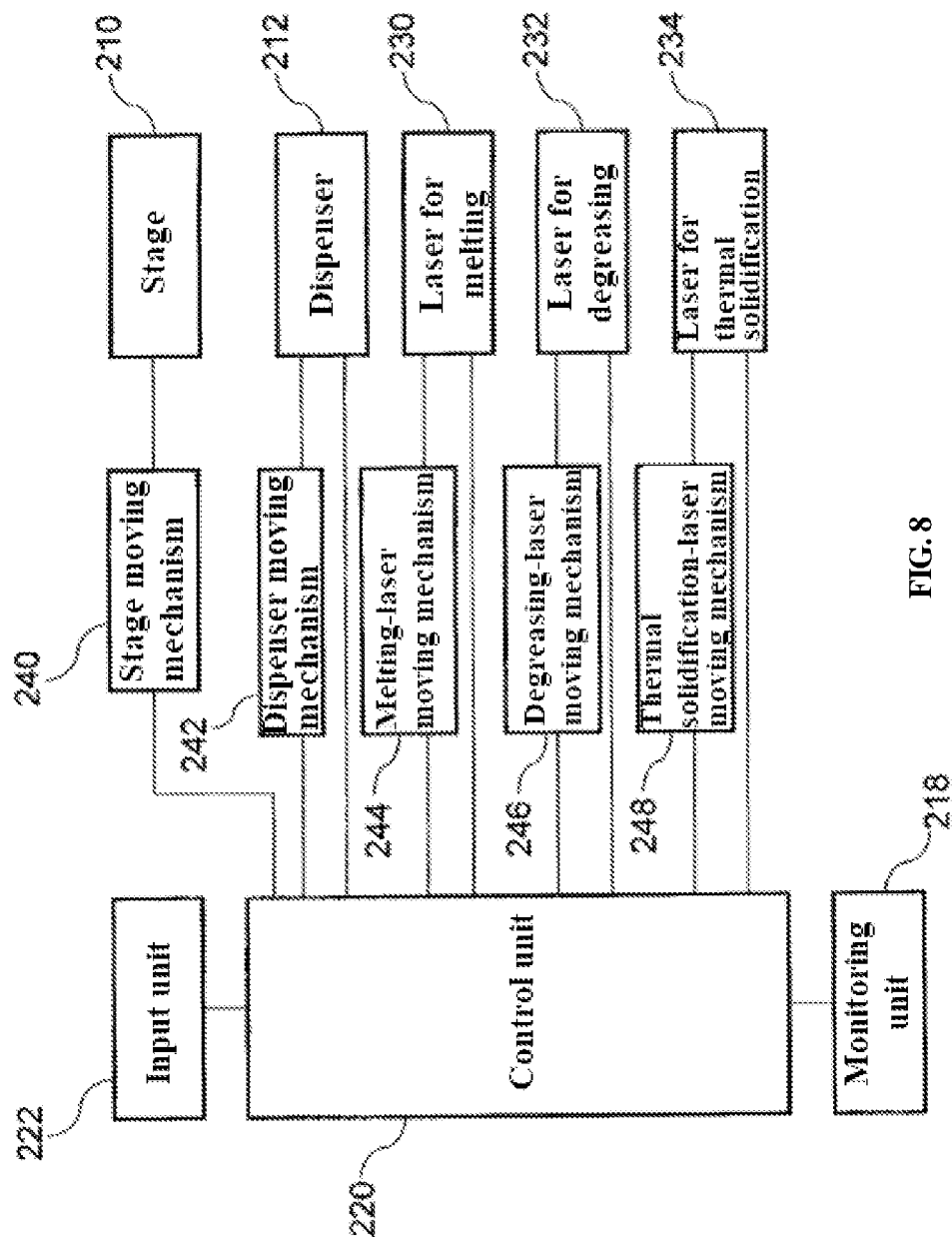
FIG. 8 is a block diagram showing an example of a system configuration of the forming apparatus of the third embodiment.

FIG. 7 is a view showing a forming apparatus 201 according to the third embodiment, and FIG. 8 is a block diagram showing an example of the system configuration of the forming apparatus 201 of the third embodiment.

In the third embodiment, precursor P' has a core-shell structure including an inorganic particle Pa' (core) and an organic coating Pb' (shell) which coats the inorganic particle Pa'. The precursor P' is solid and a large number of the precursors P' are filled in a dispenser 212. For example, the dispenser 212 discharges the precursors P' one by one onto a stage 210.

The organic coating Pb' is composed of a thermoplastic resin, etc., which is softened or melted (hereinafter simply referred to as "melted") by heat. Examples of the thermoplastic resin may include polyethylene, polypropylene, polystyrene, polyamide, polycarbonate, polyacetal, polyethylene terephthalate, vinyl chloride resin, ABS resin, and the like.

The forming apparatus 201 according to the third embodiment includes a stage 210, a dispenser 212, an immobilization unit 214, a heat source unit 216, a monitoring unit 218, and a control unit 220. While the immobilization units 14 and 114 of the first and second embodiments include LEDs 30 and 130 for curing the binder Pb, the immobilization unit 214 includes a laser for melting 230.

The laser for melting 230 applies heat to the organic coating Pb' on the stage 210. As a result, the organic coating Pb' is melted on the stage 210. For example, the laser for melting 230 can heat the precursor P' to a temperature of, for example, 80° C. to 200° C., by performing laser irradiation to the precursors P', thereby melting the organic coating Pb' of the precursors P'. The laser for melting 230 is movable in at least the x-direction and the y-direction by the melting-laser moving mechanism 244, and is rotatable, for example, about the z axis, and is also rotatable in a plane parallel to the z axis.

Hereafter, an example of a method of producing a formed body by the forming apparatus 201 of the third embodiment will be described with reference to FIGS. 9A-9G and 10.

FIGS. 9A-9G are views showing an example of a method of producing a formed body by the forming apparatus 201 of the third embodiment. FIGS. 9A-9G shows a series of processes from precursor P' discharge to thermal solidification in the production method.

Figure 9A:
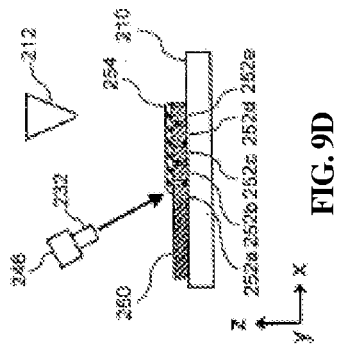
FIGS. 9A to 9G are views showing an example of a method of producing a formed body by the forming apparatus of the third embodiment.

Referring to FIG. 9A, the precursor P' is discharged onto the stage 210. Here, in the same manner as in FIGS. 3A-3F, the stage 210 has formed thereon a thermally solidified body 250, which has already been thermally solidified, and inorganic particles 252a to 252d surrounded by a solidified coating 254 solidified after melting of the organic coating Pb'. Discharge of the precursor P' is performed in order from the left side (−x direction) to the right side (+x direction) of the figure.

Figure 9B:
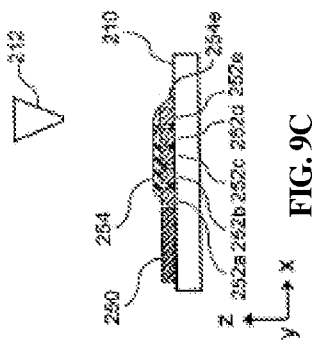

Referring to FIG. 9B, the discharged precursor P' lands beside the inorganic particle 252d. The monitoring unit 218 acquires the landing position and timing of the precursor P'. Immediately after landing, the discharged precursor P' is solid, and the organic coating 254e of the precursor P' is not integrated with the adjacent solidified coating 254. Toward this organic coating 254e, the laser for melting 230 in the immobilization unit 214 irradiates laser light. As a result, the organic coating 254e composed of thermoplastic resin is melted.

Figure 9C:
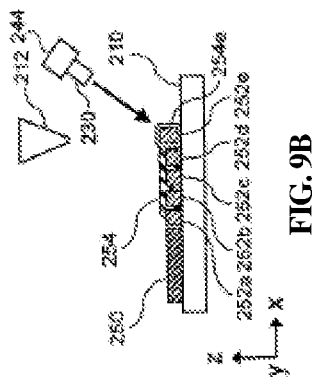

Referring to FIG. 9C, the laser for melting 230 simultaneously melts the organic coating 254 near the inorganic particle 252d adjacent to the organic coating 254e, together with the organic coating 254e, and thus the organic coating 254 is integrated with the organic coating 254e. Next, the melted organic coating 254e is solidified by natural cooling. At this time, the molted organic coating 254 is also solidified, so that the entire organic coatings surrounding the inorganic particles 252a to 252e are integrated.

Figure 9D:
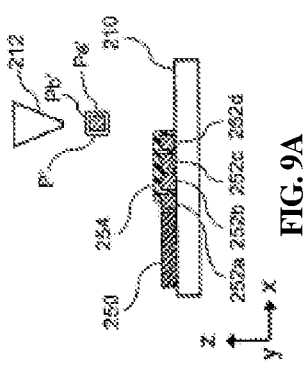

Referring to FIG. 9D, the organic coating 254 including the organic coating 254e is solidified, and the inorganic particle 252e included in the discharged precursor P' is immobilized on the stage 210.

Figure 9E:
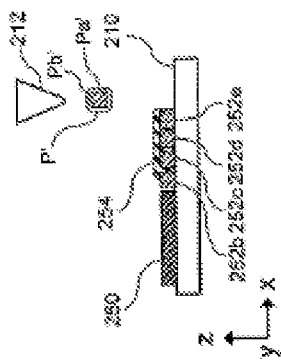
Figure 9F:
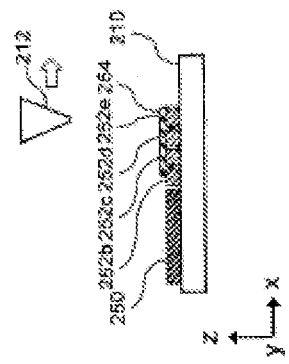
Figure 9G:
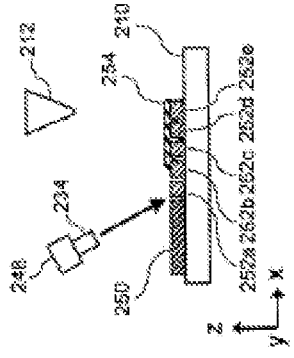

The subsequent processes shown to FIGS. 9D to 9G are substantially the same as the processes shown to FIGS. 3C to 3F. That is, referring to FIG. 9D, the laser for degreasing 232 in the heat source unit 216 irradiates laser light to the vicinity of the inorganic particle 252a, so that the solidified coating 254 in the vicinity of the inorganic particle 252a is degreased. Referring to FIG. 9E, the laser for thermal solidification 234 in the heat source unit 216 irradiates laser light near the boundary between the thermally solidified body 250 and the inorganic particle 252a, so that the thermally solidified body 250 and the inorganic particles 252a are thermally solidified. Referring to FIG. 9F, the dispenser 212 and the like move in the +x direction. Referring to FIG. 9G, the precursor P' is discharged again from the dispenser 212 onto the stage 210. Thereafter, the operation described with reference to FIGS. 9B to 9F is repeated.

Figure 10:
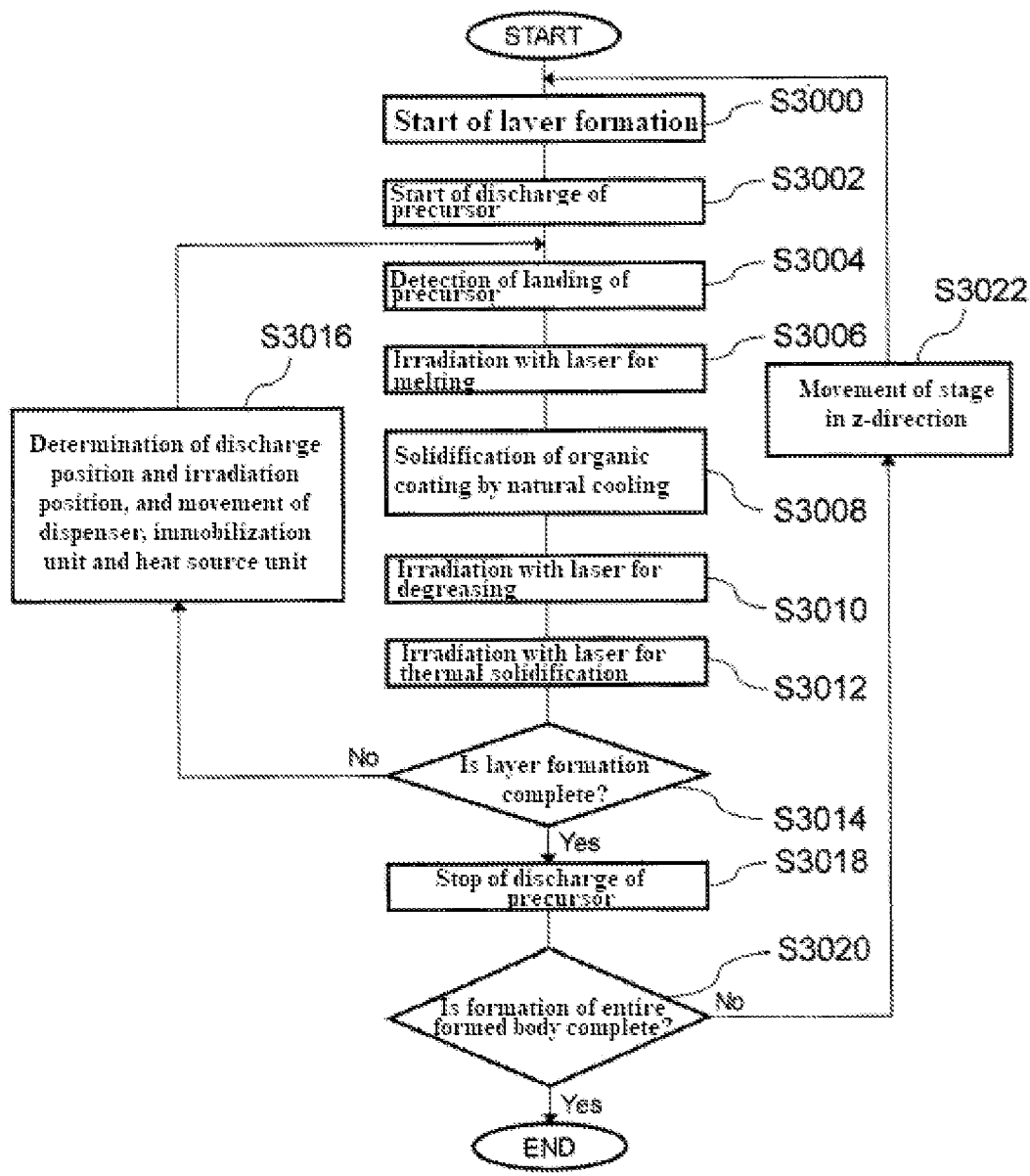
FIG. 10 is a flowchart showing an example of a method of producing a formed body by the forming apparatus of the third embodiment.

FIG. 10 is a flowchart showing an example of a method of producing a formed body by the forming apparatus 201 of the third embodiment.

Compared with the method of producing the formed body by the forming apparatus 1 shown in FIG. 4, the process of immobilizing the precursor P on the stage 210 differs.

In the first embodiment, the process of immobilizing the precursor P is performed by curing the binder Pb by the LED 30 after the landing of the precursor P is detected (S1006).

In comparison with this, in the third embodiment, after the landing of the precursor P' is detected, the control unit 220 directs the laser for melting 230 to irradiate the precursor P' with laser light for heating and melting the organic coating 254e of the precursor P' which has been landed on the stage 210 (S3006). Thereafter, the melted organic coating 254e is solidified by natural cooling (S3008). As a result, the precursor P' is immobilized on the stage 210.

When the state or temperature of the organic coating 254e is monitored by the monitoring unit 218 or any detector (e.g., a thermography device), it is possible to determine whether the organic coating 254e has been solidified. Alternatively, after a certain amount of time after the laser for melting 230 irradiates laser light, it may be determine that the organic coating 254e has been solidified. When it is determined that the organic coating 254e has been solidified, the flow proceeds to S3010.

Subsequent processes are the same as those of the first embodiment. That is, S3010 to S3022 of FIG. 10 correspond to S1008 to S1020 of FIG. 4.

[Modifications]

In the above example, after precursor P discharge, precursor immobilization, degreasing, and thermal solidification are completed, the stage moves in the z-direction and discharge of the next precursor P is performed, but the forming process is not limited thereto. For example, after immobilization of the precursor, the stage may be moved before the degreasing process, and discharge or immobilization of the next precursor may be performed at the same time as degreasing or thermal solidification. Moreover, discharge of the next precursor may be performed at the same time as immobilization of the precursor. For example, when discharge of the precursor from the dispenser is performed continuously rather than intermittently, the precursor is supplied continuously, and hence immobilization of the supplied precursor, degreasing, thermal solidification, and movement of each component, such as the stage or the laser, may be performed at the same time as the supply of the precursor.

In the above example, after the precursor lands on the stage, light irradiation for immobilization by the LED or the laser for melting is performed, but the timing of the immobilization process is not limited thereto. For example, light irradiation may be performed while the precursor is discharged and falls.

In the above example, the laser for degreasing and the laser for thermal solidification irradiate laser light to substantially the same region, but their irradiation positions do not necessarily need to be the same. For example, the irradiation position of the laser for thermal solidification may be spaced apart from the irradiation position of the laser for degreasing at a predetermined distance (for example, about 1 mm), and the irradiation of the laser for thermal solidification may be controlled so as to follow the irradiation of the laser for degreasing.

In the above example, the operation of the forming apparatus can be stabilized by temporarily immobilizing the precursor P on the stage using the LED or the melting laser before the degreasing process. However, for example, this immobilization process may be omitted, and when landing of the precursor P onto the stage is detected, degreasing of the binder Pb may be performed by irradiating the laser for degreasing.

In the above example, the immobilization unit and the heat source unit are provided as separate components. However, for example, as a light source for curing the photocurable composition of the precursor, the laser for degreasing in the heat source unit, the laser for thermal solidification, or the laser for degreasing/thermal solidification may also be used. In this case, when the immobilization is performed, a decreased output of the laser may be used, and when degreasing and thermal solidification are performed, an increased output of the laser may be used. In particular, when the laser for degreasing/thermal solidification is used, all of immobilization, degreasing, and thermal solidification can be performed by a single laser device, and thus the configuration of the molding apparatus can be simplified.

In the above example, after the heat solidification process is performed and before the landing of the precursor is detected, the discharge position of the dispenser and the irradiation positions of the immobilization unit and the heat source unit may be determined by the control unit, and the arrangement thereof may be changed, but the timing of determination of such discharge and irradiation positions and the change in arrangement are not limited thereto. The control unit may determine the discharge position of the dispenser and the irradiation position of the immobilization unit and the heat source unit at any timing, and also direct the dispenser moving mechanism, the LED moving mechanism, the degreasing-laser moving mechanism and the heat solidification-laser moving mechanism to change the arrangement of these units at any timing.

In the above example, the discharge position and the irradiation position are determined based on the monitoring data obtained by the monitoring unit, but the discharge of the precursor and each process may be performed in accordance with a sequence of predetermined discharge positions and irradiation positions without using the monitoring data. Similarly, in the above example, the irradiation timing of the immobilization unit or the heat source unit is determined based on the monitoring data obtained by the monitoring unit, but the irradiation timing of the immobilization unit or the heat source unit may also be determined based on the timing at which the dispenser actually discharges the precursor, the density of the precursor, the amount of precursor discharged, the distance between the dispenser and the stage, etc., without using the monitoring data.

In the above example, the process of forming the formed body layer-by-layer from the bottom by descending the stage step by step in the z-direction has been described, but the forming process is not necessarily performed layer-by-layer. For example, when the height or direction of the dispenser, the immobilization unit and the heat source unit are properly changed, the formed body may be formed by depositing the precursor layer-by-layer on the stage without moving the stage in the z-direction. In this case, the dispenser, the immobilization unit and the heat source unit may be movable in the z-direction by the dispenser moving mechanism, the LED moving mechanism, the degreasing-laser moving mechanism, and the thermal solidification-laser moving mechanism.

Moreover, in the above example, the dispenser, the immobilization unit and the heat source unit are moved based on the determined discharge position and irradiation position, but the stage may be moved in the x-direction and the y-direction instead of moving the dispenser, the immobilization unit and the heat source unit. That is, the positions of the dispenser, the immobilization unit and the heat source unit may be fixed, and the stage may be moved in the x-direction, the y-direction and the z-direction.

In the above example, the dispenser is used as the supply unit for supplying the precursor P, but the supply unit is not limited thereto. For example, when the precursor P is a solid having a certain size or more, a fine arm mechanism that can be disposed at any place on the stage while maintaining the precursor P by adsorption using physical gripping or magnetic action may be used as the supply unit.

Although the present disclosure has been described above with reference to the exemplary embodiments and the accompanying drawings, the present disclosure is not limited thereto, and those skilled in the technical field to which the present disclosure pertains will appreciate that various modifications and variations are possible within the technical spirit of the present disclosure and the equivalent scope of the claims.

The invention claimed is:

1. A forming apparatus, comprising:
    a stage;
    a supply unit configured to intermittently or continuously supply a precursor containing an inorganic material onto the stage, the precursor comprising an organic binder in which the inorganic material has been dispersed or an organic coating surrounding the inorganic material;
    a heat source unit comprising a thermal solidification heat source and a degreasing heat source, the thermal solidification heat source configured to perform thermal solidification of the inorganic material of the precursor supplied from the supply unit to the stage, the degreasing heat source configured to degrease the organic binder or the organic coating by applying heat to the precursor, the degreasing heat source being different than the thermal solidification heat source; and
    a control unit configured to control the supply unit and the heat source unit so that the heat source for thermal solidification performs thermal solidification of the precursor on the stage, during a period ranging from the start of the supply of the precursor by the supply unit to the stop of the supply of the precursor, to form a formed body, the control unit being configured to control the degreasing heat source so that degreasing of the precursor is performed before thermal solidification of the precursor by the thermal solidification heat source,
    wherein at least one of the height and direction of the supply unit is changeable, and thereby a height of the next supply position by the supply unit can be selected to be the height or a different height from the current supply position without performing a forming process layer-by-layer, and
    wherein at least one of the height and direction of the heat source unit is changeable, and thereby a height of the next irradiating position by the heat source unit can be selected to be the height or a different height from the current irradiation position without performing a forming process layer-by-layer.

2. The forming apparatus of claim 1, wherein the control unit controls the supply unit and the heat source unit such that supply of the precursor from the supply unit and the thermal solidification of the precursor from the heat source unit are repeated a plurality of times during a period ranging from the start of the supply of the precursor by the supply unit to the stop of the supply of the precursor.

3. The forming apparatus of claim 1, further comprising an immobilization unit configured to immobilize the precursor on the stage.

4. The forming apparatus of claim 3, wherein
    the precursor comprises an organic binder comprising a photocurable composition, and
    the immobilization unit comprises a light source configured to cure the photocurable composition in the precursor before thermal solidification of the precursor by the heat source unit.

5. The forming apparatus of claim 3, wherein
    the precursor comprises inorganic particles coated with an organic coating, and
    the immobilization unit comprises a heat source for melting configured to melt the organic coating of the precursor before thermal solidification of the precursor by the heat source unit.

6. The forming apparatus of claim 1, further comprising:
    a monitoring unit configured to monitor the precursor on the stage,
    wherein the control unit is configured to determine at least one of a position on the stage to which the precursor is supplied, and a position on the stage at which the thermal solidification is performed, based on information from the monitoring unit.

7. The forming apparatus of claim 1, wherein the control unit is configured to control the supply unit and the heat source unit such that the inorganic material is formed into the formed body having a three-dimensional shape, based on inputted three-dimensional shape data of the formed body provided to the control unit.

8. A method of producing a formed body from a precursor comprising an inorganic material, the method comprising:
   (a) supplying the precursor intermittently or continuously from a supply unit onto a stage, the precursor comprising an organic binder in which the inorganic material has been dispersed or an organic coating surrounding the inorganic material;
   (b) thermally solidifying the inorganic material of the precursor that has been supplied to the stage using a thermal solidification heat source, during a period ranging from the start of the supply of the precursor by the supply unit to the stop of the supply of the precursor; and
   degreasing the organic binder or the organic coating by applying heat to the precursor using a degreasing heat source, the degreasing heat source being different than the thermal solidification heat source,
   wherein the supplying includes selecting a height of the next supply position to be the same height as or different height from the current supply position without performing a forming process layer-by-layer, and
   wherein the thermally solidifying and degreasing includes selecting a height of the next irradiating position to be the same height as or different height from the current irradiating position without performing a forming process layer-by-layer.

9. The method of producing the formed body according to claim 8, further comprising:
   (c) repeating steps (a) and (b) to produce the formed body.

10. The method of producing the formed body according to claim 8, wherein
    the method further comprises:
    (d) moving the stage downward in a vertical direction,
    wherein the formed body having a three-dimensional shape is formed by repeating steps (a), (b), and (d).

11. The method of producing the formed body according to claim 8, wherein step (b) further comprises locally irradiating the precursor with a laser or electron beam.

12. The method of producing the formed body according to claim 8, wherein the method further comprises:
    (e) curing a photocurable composition in the organic binder of the supplied precursor before step (b).

13. The method of producing the formed body according to claim 12, wherein the degreasing of the organic binder or the organic coating is performed after step (e) and before step (b).

14. The method of producing the formed body according to claim 8, wherein the method further comprises:
    (g) determining at least one of a position on the stage to which the precursor is supplied in the step (a), and a position on the stage at which the thermal solidification is performed in step (b), based on arrangement of the precursor on the stage.

* * * * *